(12) United States Patent
Zerweck et al.

(10) Patent No.: US 10,005,147 B2
(45) Date of Patent: Jun. 26, 2018

(54) SOLDERING TIP FASTENING SYSTEM

(71) Applicant: Apex Brands, Inc., Apex, NC (US)

(72) Inventors: Ralf Zerweck, Boennigheim (DE);
Bernd Neidermayer, Gemmrigheim (DE)

(73) Assignee: APEX BRANDS, INC., Wilmington, DE (US)

( * ) Notice: Subject to any disclaimer, the term of this patent is extended or adjusted under 35 U.S.C. 154(b) by 0 days. days.

(21) Appl. No.: 15/112,821

(22) PCT Filed: Feb. 24, 2015

(86) PCT No.: PCT/EP2015/000424
§ 371 (c)(1),
(2) Date: Jul. 20, 2016

(87) PCT Pub. No.: WO2015/128080
PCT Pub. Date: Sep. 3, 2015

(65) Prior Publication Data
US 2016/0325371 A1 Nov. 10, 2016

(30) Foreign Application Priority Data

Feb. 28, 2014 (DE) .................... 20 2014 001 956 U (51) Int. Cl.
*B23K 3/00* (2006.01)
*B23K 3/02* (2006.01)
*B23K 3/03* (2006.01)

(52) U.S. Cl.
CPC ............ *B23K 3/026* (2013.01); *B23K 3/0369* (2013.01)

(58) Field of Classification Search
CPC ...... B23K 3/0369; B23K 3/026; B23K 3/027; B23K 3/0338; B23K 3/0361; B23K 3/0392
(Continued)

(56) References Cited

U.S. PATENT DOCUMENTS 1,667,618 A 1/1924 Abbott
1,904,051 A 9/1929 Jones
(Continued)

FOREIGN PATENT DOCUMENTS

DE 682406 C 10/1939
DE 1565515 B1 11/1969
(Continued)

OTHER PUBLICATIONS

EPO Communication, "Observations by Third Parties," Application No. 15706680.4-1702 / 3110587 (EP3110587), dated Nov. 2, 2017, pp. 1-13 (translation included).

*Primary Examiner* — Erin B Saad
(74) *Attorney, Agent, or Firm* — Coats & Bennett, PLLC (57) ABSTRACT

The present invention relates to a soldering tip fastening sleeve (3) comprising a soldering device fastening portion (7) and a soldering tip fastening portion (6). The soldering device fastening portion (7) has an internal measurement (15) and an external measurement. Also the soldering tip fastening portion (6) has an internal measurement (16) and an external measurement (14) as well as a collar holder (10). The soldering tip fastening portion (6) and the soldering device fastening portion (7) are associated with different ends of the soldering tip fastening sleeve (3). The soldering tip fastening sleeve (3) according to the present invention is characterized in that the collar holder (10) is provided on a first subsector (17) of a circumference of the soldering tip fastening sleeve (3). The present invention also relates to a soldering tip (2) comprising a soldering portion (4) and a fastening portion (5). The soldering tip (2) is adapted to be fixed to a soldering device (30) through the fastening portion (5), a maximum external measurement (5a) of said fastening portion (5) being equal to or smaller than a maximum external measurement (4a) of the soldering portion (4), or the soldering portion being angled. The soldering tip (2)

(Continued)

according to the present invention is characterized in that the fastening portion (5) comprises a collar (9).

18 Claims, 8 Drawing Sheets

(58) Field of Classification Search
USPC .................................................. 228/51, 55
See application file for complete search history.

(56) References Cited

U.S. PATENT DOCUMENTS

| | | | |
|---|---|---|---|
| 4,560,101 A * | 12/1985 | Wilhelmson | ........... B23K 1/018 |
| | | | 228/54 |
| 5,059,769 A | 10/1991 | Fortune | |
| 5,248,076 A | 9/1993 | Eisele et al. | |
| 6,215,104 B1 | 4/2001 | Kurpiela et al. | |
| 2001/0045420 A1 | 11/2001 | Bong et al. | |

FOREIGN PATENT DOCUMENTS

| | | |
|---|---|---|
| DE | 8506482 U1 | 5/1985 |
| EP | 0077071 A1 | 4/1983 |
| EP | 0145248 A1 | 6/1985 |
| EP | 0932473 B1 | 8/1998 |
| TW | 434083 B | 5/2001 |
| WO | 9102618 A1 | 3/1991 |
| WO | 9726108 A1 | 7/1997 |

\* cited by examiner

SOLDERING TIP FASTENING SYSTEM

The present invention relates generally to the fastening of soldering tips to soldering devices. More specifically, the invention relates to a soldering tip fastening sleeve according to the preamble of claim 1, to a soldering tip according to the preamble of claim 13, to a soldering tip fastening system consisting of such components as well as to a soldering device comprising one or a plurality of said components.

Soldering devices are known in practice. They normally comprise a heating element, which is secured to a handle or similar units of the soldering device. For fastening a soldering tip to the heating element or to other units of the soldering device, fastening sleeves are often used. These fastening sleeves are often configured such that the soldering tip to be fastened must be pushed through the respective sleeve, whereupon the fastening sleeve is pulled over the heating element and secured in position on the latter or elsewhere on the soldering device. Such conventional systems are disadvantageous insofar as bent soldering tips or soldering tips whose diameter is larger than the internal diameter of the fastening sleeve cannot be used with such systems.

WO 91/02618 A1 discloses a solution for angled soldering tips. The soldering tip disclosed there is provided with a fastening portion having formed therein an angled groove. Together with a corresponding sleeve, a bayonet lock is thus formed. A soldering tip of this type can, with the fastening portion first, be introduced in the fastening sleeve and secured to the latter. Hence, a possibly angled soldering section of the soldering tip need not be passed through the sleeve and can thus be designed more freely.

This solution is primarily disadvantageous insofar as the fastening groove at the soldering tip entails high productions costs and effort, since at least one groove, and normally two grooves rather than one, have to be cut in. Matters are complicated further by the fact that, in the case of cylindrical fastening portions, at least one portion per groove must be produced by cutting in the circumferential direction of such a cylindrical fastening portion. This necessitates a complicated guidance of the tool or of the workpiece. This drawback from a production point of view becomes particularly serious against the background that soldering tips are consumables that have to be replaced frequently and must therefore be produced in correspondingly large numbers.

It is the object of the present invention to fasten soldering tips of arbitrary shape and arbitrary outer dimensions to soldering devices with the aid of fastening sleeves and to guarantee simultaneously a production of the soldering tip that is as easy and as cost-efficient as possible.

According to the present invention, this object is achieved by a soldering tip fastening sleeve having the features of claim 1 and by a soldering tip having the features of claim 13.

Advantageous further developments of the invention are disclosed in the subclaims.

The soldering tip fastening sleeve according to the present invention as disclosed in claim 1 comprises a soldering device fastening portion having an internal measurement and an external measurement and a soldering tip fastening portion which also has an internal measurement and an external measurement as well as a collar holder, the soldering tip fastening portion and the soldering device fastening portion being associated with different ends of the soldering tip fastening sleeve. The soldering tip fastening sleeve according to the present invention is characterized in that the collar holder is provided on a first subsector of a circumference of the soldering tip fastening sleeve. This allows insertion of a respective soldering tip, so that such a soldering tip need no longer be passed through the soldering tip fastening sleeve. The soldering tip can thus be designed independently of the dimensions and the shape of the soldering tip fastening sleeve. In addition, the structural design of the soldering tip fastening sleeve according to the present invention allows the soldering tip to be produced more easily, as will be explained in more detail in the following.

The collar holder may be any structure on the soldering tip fastening sleeve, which is suitable for restricting the freedom of movement of a respective collar on a respective soldering tip with respect to at least one degree of freedom. It may e.g. be a structural reduction of size of the internal measurement of the soldering tip fastening sleeve. Imaginable is, for example, a soldering tip fastening sleeve made of a thin-walled tube, in the case of which the edge of a first subsector is bent inwardly towards a center axis of the tube. It is, however, also imaginable that the soldering tip fastening sleeve is made of solid material and that the cavity defining the internal measurement is formed by a hole, which does not extend up to the front end of the soldering tip fastening sleeve, whereby a step is formed, which can serve as a collar holder.

The soldering tip fastening sleeve may have any shape. In particular, tubular cross-sections are possible. Round cross-sections of the tube as well as angular tubular cross-sections are imaginable. Internal measurements are here defined as a distance in a cross-sectional plane, which extends perpendicular to the center axis of the tube, between opposed inside walls of the same. In the case of a circular tubular cross-section the internal measurements correspond e.g. to the internal diameter. This applies analogously to the external measurements. As has already been mentioned, it will be of advantage when the collar holder delimits the internal measurement of the soldering tip fastening sleeve. A collar holder can thus be realized in a particularly easy manner.

It is imaginable that the internal measurement of the soldering tip fastening portion is smaller than the internal measurement of the soldering device fastening portion.

In addition, it will be of advantage if the first subsector has a central angle which is an angle of 180° or less. The central angle is here an angle between two straight lines, which extend in a plane perpendicular to a center axis of the soldering tip fastening sleeve, meet at the point of intersection between the center axis and the respective cross-sectional plane and delimit the first subsector, i.e. the collar holder extends between these two lines. A central angle dimensioned in this way facilitates, as will be explained in more detail in the following, the insertion of a respective soldering tip into the soldering tip fastening sleeve according to the present invention. A central angle of more than 180° and less than 360° is, however, imaginable as well.

According to an advantageous embodiment, the soldering tip fastening sleeve includes a second subsector, which does not have provided thereon any collar holder. Other variants may be configured such that a plurality of first subsectors as well as a plurality of second subsectors are provided, so that the collar holder consists of a plurality of toothlike projections.

It is also imaginable that the second subsector has provided thereon a projection. This will be of advantage, in particular in cases where the collar holder is only provided on one first subsector. A projection is, however, also imaginable, when a plurality of first subsectors is provided. As will become clear hereinbelow, such a projection can improve the fastening effect and reliability of the connection between the soldering tip and the soldering tip fastening sleeve. The projection may be an inwardly bent section of the soldering tip fastening sleeve. However, a structure attached e.g. by an adhesive or by welding is imaginable as well. In addition, the projection may be provided by a suitable deformation of the sleeve, e.g. an indentation or a depression.

According to an advantageous embodiment, the edge of the second subsector is spaced apart from an edge of the collar holder in an axial direction of the soldering tip fastening sleeve. This, in turn, may facilitate insertion of a soldering tip into the soldering tip fastening sleeve.

According to a particularly advantageous embodiment, the soldering tip fastening sleeve is provided with a recess at a transition between the first and second subsectors. This is another possibility of facilitating insertion of a suitable soldering tip into the soldering tip fastening sleeve. In particular if the above-mentioned distance existing in an axial direction between the edge of the second subsector and the edge of the collar holder is very small, or if there is no distance at all, such a recess will be of advantage.

It is imaginable that the collar holder comprises an inwardly flanged structure. Such an inwardly flanged structure can be produced by subjecting a tubular semifinished product to a simple forming step. Hence, it represents a cost-efficient variant of the collar holder.

It is conceivable that the soldering device fastening portion is provided with a nut, which is configured for screw-fastening to a soldering device. Such a nut is a well-proven fastener between the soldering tip fastening sleeve and the soldering device. Simple, intuitive and reliable fastening is thus guaranteed.

According to an advantageous embodiment, the nut may be connected to the soldering tip fastening sleeve in a non-releasable manner or it may be formed integrally therewith. This leads to a reduction of the number of parts that have to be assembled for establishing the soldering device.

It is imaginable that another advantageous variant is configured such that the nut is a union nut. Such union nuts are possibly available as standard parts, whereby costs are reduced. Also the production of the soldering tip fastening sleeve may be facilitated in this way.

The present invention also relates to a soldering tip comprising a soldering portion and a fastening portion, wherein the soldering tip is adapted to be fixed to a soldering device by said fastening portion, and wherein a maximum external measurement of the fastening portion is equal to or smaller than a maximum external measurement of the soldering portion, or the soldering portion is angled. The soldering tip according to the present invention is characterized in that the fastening portion comprises a collar. Such a collar can, e.g. in the case of round cross-sections, be produced easily and consequently at a reasonable price with the aid of turning processes. Especially since soldering tips are normally consumables, these cost advantages in connection with manufacturing are of particular importance. Up to now, soldering tips in the case of which a fastening portion has maximum external dimensions which are equal to or smaller than maximum external dimensions of a soldering portion, or soldering tips with angled soldering portions, could only be fixed in position by means of much more complicated fastening structures, such as the bayonet catch disclosed in the above-mentioned WO 91/02618 A1.

It is imaginable that the collar is provided with a recess. This recess can be used for improving the fastening effect or for facilitating handling. Corresponding structures provided on an associated soldering tip fastening sleeve or on the respective soldering device can be accommodated in such a recess. This may serve to position the soldering tip relative to the soldering tip fastening sleeve or the entire soldering device in a predefined orientation. It is also imaginable that the recess accommodates an additional locking element, e.g. the projection of the above-described soldering tip fastening sleeve. The recess may e.g. be provided in the form of a gap in the collar. In addition, it may extend down to and into the actual soldering tip or it may extend only partially into the collar in a radial direction.

It is conceivable that the collar is provided on at least one third subsector. The third subsector is provided on the soldering tip and is defined analogously to the first and second subsectors on the soldering tip fastening sleeve. The limitation of the collar to this third subsector may serve to provide the recess. Here, it may be of advantage when the third subsector has a central angle of at least 330°. In this case, the recess may be provided on a fourth subsector having a central angle of 30° or less. It is, however, also imaginable that the two ends of the third subsector have provided between them a plurality of recesses or, analogously, a collar section or a plurality of collar sections.

Irrespectively of the size of the third subsector, it may be of advantage when a plurality of third subsectors is provided. These third subsectors may, for example, be uniformly distributed over the circumference of the soldering tip, so that neighboring subsectors have provided between them a respective recess. However, a plurality of third subsectors having different central angles may be provided just as well.

The present invention also relates to a soldering tip fastening system comprising an above-described soldering tip fastening sleeve as well as an above-described soldering tip.

According to an advantageous embodiment, the soldering tip is adapted to be inserted into the sleeve by a pivotal movement and/or translationally in a direction, said direction extending at an angle relative to a center axis of the sleeve. In this way, the collar of the soldering tip can be moved past the collar holder of the soldering tip fastening sleeve and inserted into the soldering tip fastening sleeve. Hence, the soldering tip need not be passed through the soldering tip fastening sleeve, and this allows the soldering portion to be designed independently of the size of the soldering tip fastening sleeve. In addition, a cost-efficient production of the soldering tip is possible insofar as only a collar which is easy to manufacture is provided.

In a soldering tip fastening system which comprises a soldering tip fastening sleeve according to the present invention, said soldering tip fastening sleeve including a second subsector having no collar holder provided thereon and an edge of said second subsector being spaced apart from an edge of the collar holder in an axial direction of the soldering tip fastening sleeve, and which further comprises a soldering tip according to the present invention, it will be of advantage if the above-mentioned axial distance at the soldering tip fastening sleeve is smaller than an axial thickness of the collar at the soldering tip. In this way, an axial form- and/or force-fit connection between the collar and the collar holder and a radial form- and/or force-fit connection between the edge of the second subsector and the collar can be established, when the soldering tip has been inserted. A reliable connection between the soldering tip and the soldering tip fastening sleeve can thus be guaranteed.

If the soldering tip fastening system comprises a soldering tip fastening sleeve with a projection provided on the second subsector and when it further comprises a soldering tip having formed therein the above-described recess, it is imaginable that the projection is adapted to be accommodated in the recess of the collar. This can enable the orientation of the soldering tip in a predefined position. It is also imaginable that, during insertion of the soldering tip, the projection is fully passed through the recess and that the soldering tip is then rotated so as to allow further locking through engagement between the projection and the collar.

The soldering tip fastening system according to the present invention provides the advantageous possibility of configuring the maximum external measurement of the soldering portion of the soldering tip such that it is larger than the minimum internal measurement of the soldering tip fastening sleeve. The soldering tip and the soldering tip fastening sleeve can thus be designed independently of one another.

A further variant provides another advantageous possibility of configuring the maximum external measurement of the soldering portion of the soldering tip such that it is larger than the maximum external measurement of the soldering tip fastening sleeve.

Still another variant provides a further advantageous possibility of configuring the maximum external measurement of the soldering portion of the soldering tip such that it is larger than the internal measurement of the soldering tip fastening portion.

The present invention also relates to a soldering device comprising a soldering tip fastening sleeve of the above-described type and/or a soldering tip of the above-described type and/or a soldering tip fastening system of the above-describe type.

The present invention also relates to a soldering tip fastening sleeve, a soldering tip, a soldering tip fastening system as well as a soldering device of the above-describe type.

In the following, an advantageous embodiment of the present invention will be explained in more detail making reference to the drawings.

Figure 1A:
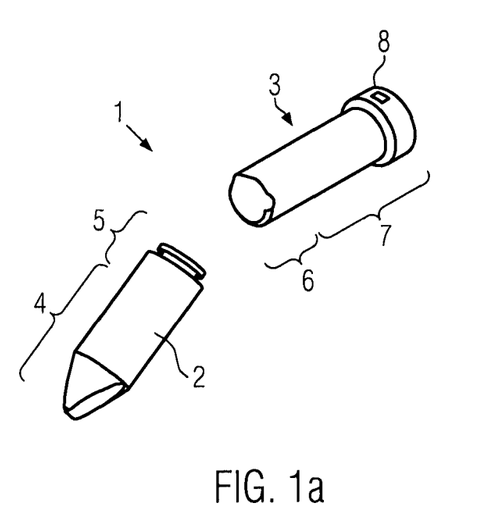
FIG. 1a to 1c show a perspective view of a soldering tip fastening system according to the present invention, which comprises a soldering tip according to the present invention and a soldering tip fastening sleeve according to the present invention, according to a first embodiment.
Figure 1B:
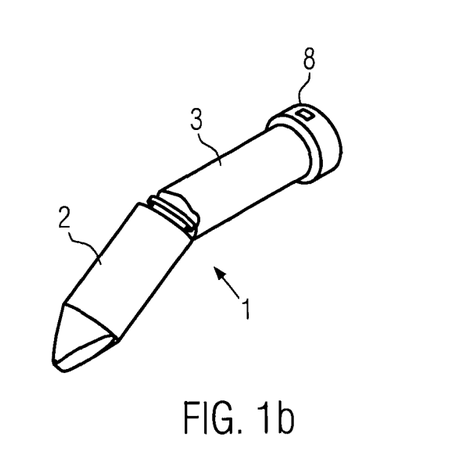
Figure 1C:
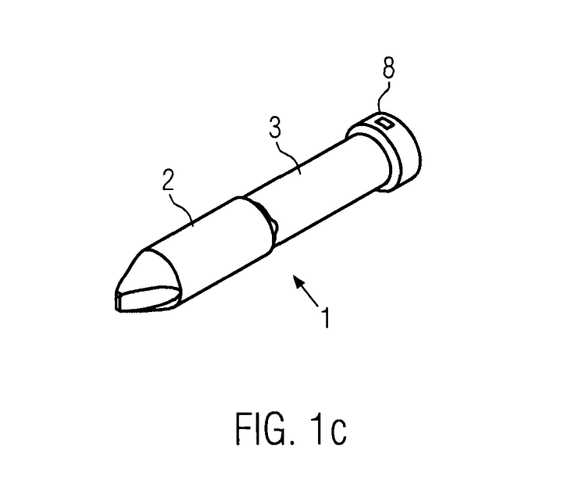

FIG. 1a to 1c show a soldering tip fastening system 1. The figures show various stages of an insertion process, in which a soldering tip 2 is inserted into a soldering tip fastening sleeve 3. The soldering tip 2 is inserted into the soldering tip fastening sleeve by a pivotal movement and/or translationally in a direction of insertion R (cf. FIG. 3). The direction R extends at an angle 31 to a center axis 12, which will be explained in more detail hereinbelow. The soldering tip 2 comprises a soldering portion 4 with a maximum external measurement 4a and a fastening portion 5 with a maximum external measurement 5a. The soldering tip fastening sleeve comprises a soldering tip fastening portion 6 and a soldering device fastening portion 7. It is clearly visible that, in the embodiment shown, the soldering device fastening portion 7 of the soldering tip fastening sleeve 3 includes a nut 8. In the present embodiment, said nut 8 is configured as a union nut. However, the nut 8 may also be fixedly connected to the other portions of the soldering tip fastening sleeve 3 or be formed integrally therewith.

Figure 4:
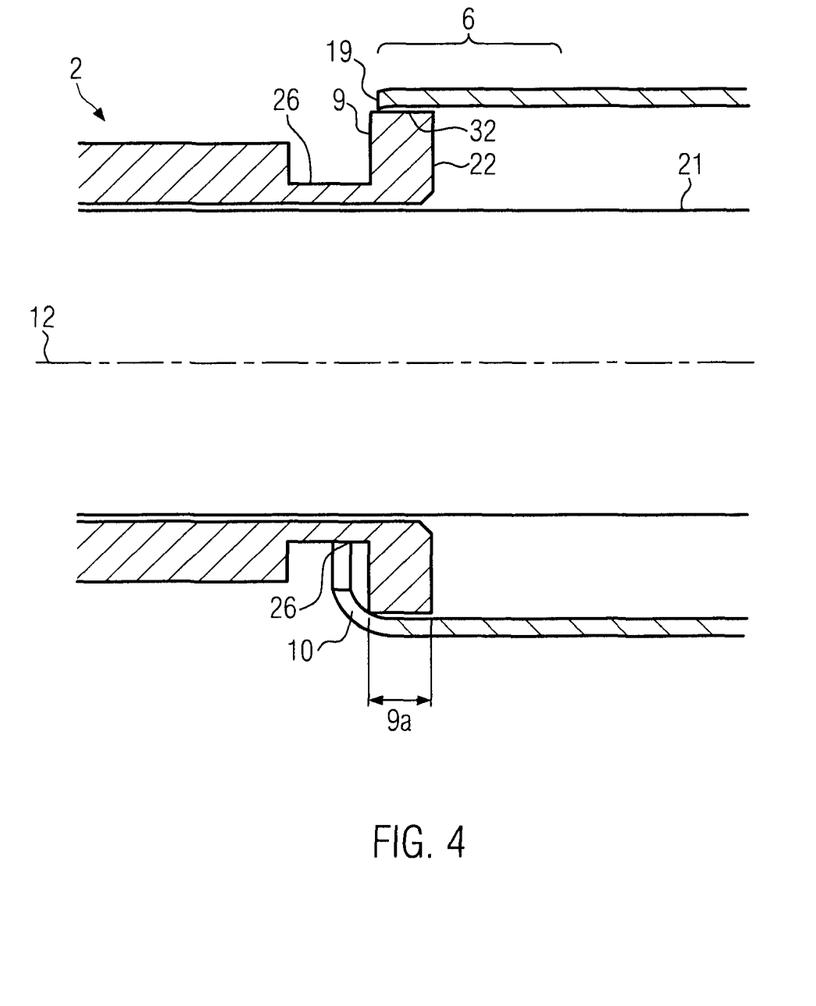
FIG. 4 shows the sectional side view according to FIG. 3, a soldering tip according to the present invention and a heating element being here additionally shown.

The fastening portion 5 of the soldering tip 2 has a collar 9 with an axial thickness 9a (cf. FIG. 4a). For fastening the soldering tip 2 to a soldering device 30, that will be described in more detail hereinbelow with reference to FIG. 11, the fastening portion 5 and the soldering tip fastening portion 6 are brought into engagement with one another. To this end, the collar 9 is inserted into a collar holder 10 (cf. FIG. 2), which will be described in more detail hereinbelow. As can clearly be seen from FIG. 1a to 1c, the soldering tip 2 need not be passed through the soldering tip fastening sleeve 3, so that the soldering portion 4 can be designed independently of the dimensions of the soldering tip fastening sleeve 3.

Figure 2:
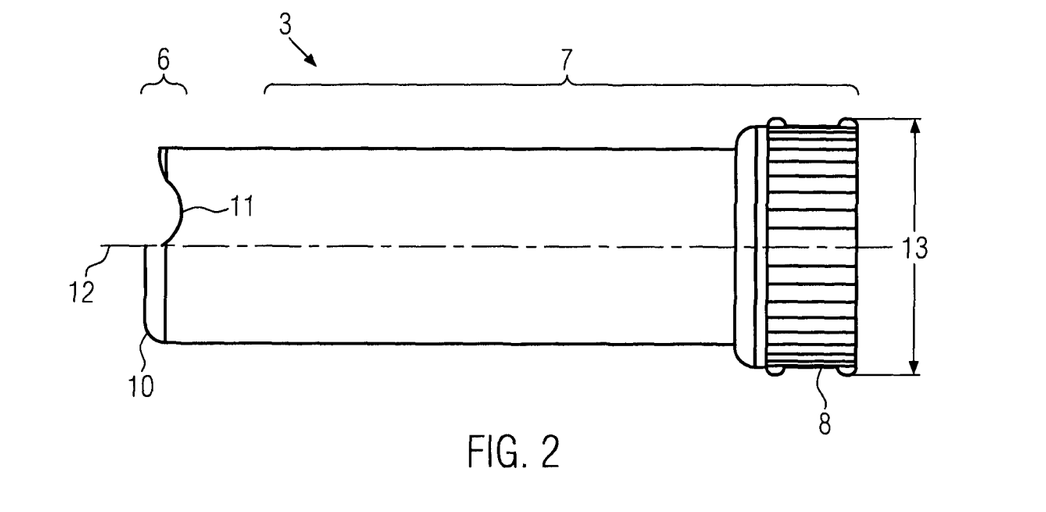
FIG. 2 shows a side view of a soldering tip fastening sleeve according to the present invention according to the first embodiment.

FIG. 2 shows the soldering tip fastening sleeve 3 in a detailed side view. The collar holder 10 is here clearly visible. In addition, a recess 11 can be seen, which has the shape of a circular arc and which, optionally, can facilitate insertion of the collar 9 into the soldering tip fastening sleeve 3. It is, however, also imaginable that no such recess 11 is provided. The center axis 12 of the soldering tip fastening sleeve 3 can be seen as well. In the present embodiment, in which the soldering tip fastening sleeve 3 has a tubular, circular cross-section, this center axis is defined by the cylindrical circumferential surface of the soldering tip fastening sleeve 3. In the embodiment described, the soldering tip fastening sleeve has a maximum external measurement 13. In this case, this maximum external measurement 13 is defined by the external diameter of the nut 8. In alternative embodiments of the soldering tip fastening sleeve the maximum external measurement 13 of the soldering tip fastening sleeve 3 may, however, also be defined by any other structure.

Figure 3:
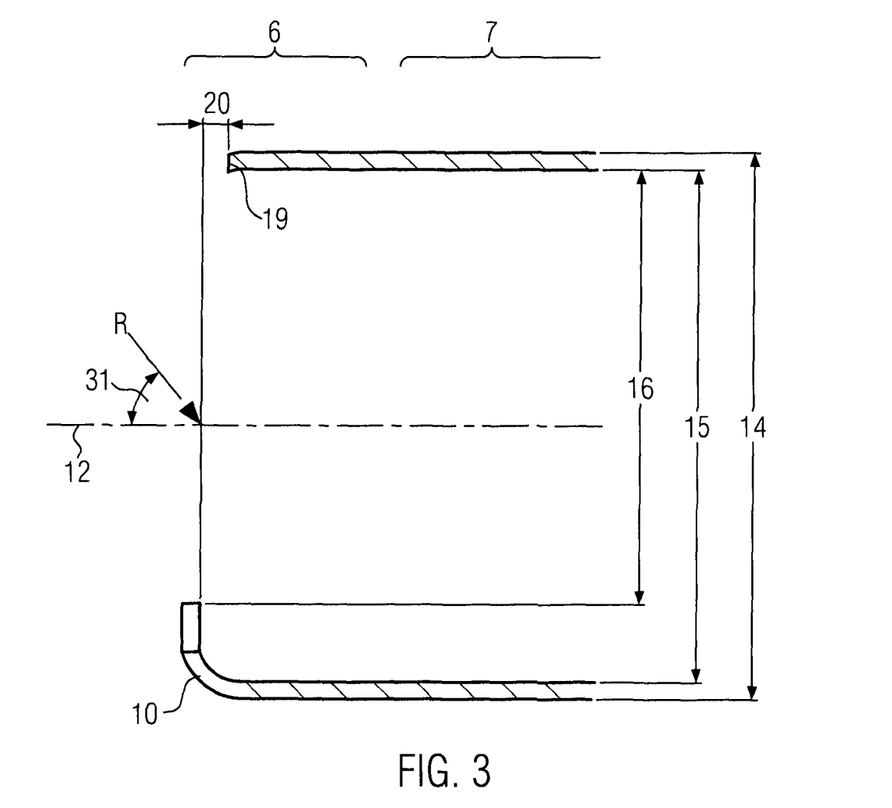
FIG. 3 shows a sectional side view of the soldering tip fastening sleeve according to FIG. 2, only a portion facing the soldering tip being here shown.

FIG. 3 shows a sectional side view of a portion of the soldering tip fastening sleeve 3, said portion being located on the left in FIG. 2. It can be seen that the collar holder 10 is an inwardly flanged structure in the present embodiment. However, the structure provided may be any structure which is suitable for fastening a collar and which is manufactured in any manner. In addition, an external measurement 14 of the soldering tip fastening sleeve is visible. Likewise, an internal measurement 15 of the soldering device fastening portion as well as an internal measurement 16 of the soldering tip fastening portion can be seen.

Figure 5:
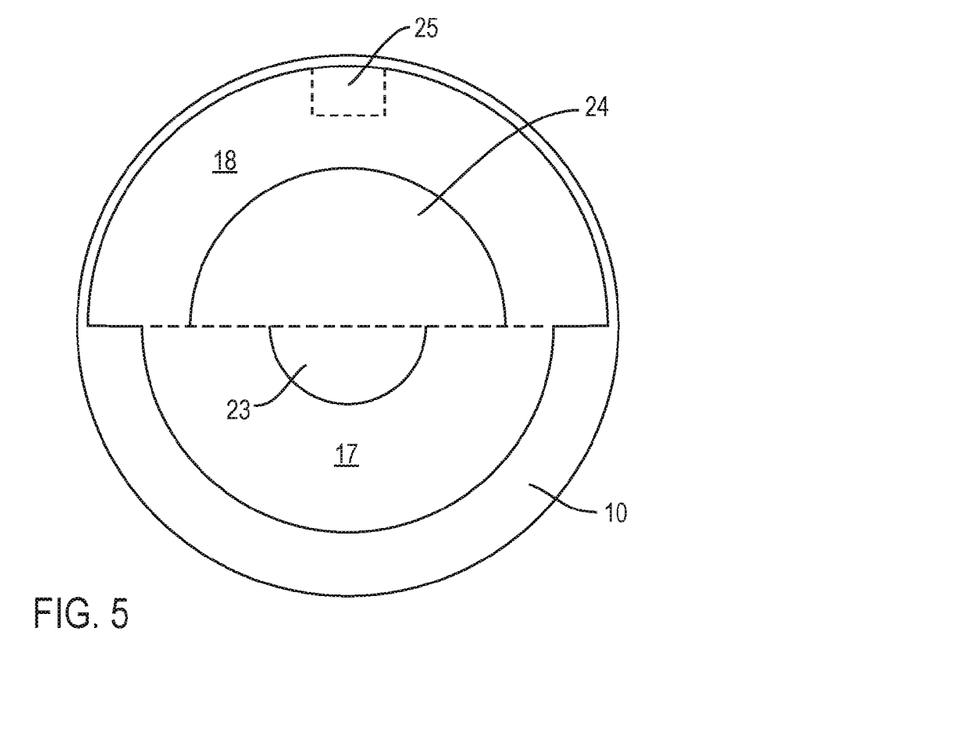
FIG. 5 shows a front view of the soldering tip fastening sleeve according to the first embodiment with view directed axially towards the soldering device fastening portion.

In the present embodiment, the collar holder 10 is provided on a first subsector 17 (cf. FIG. 5). A second subsector 18 of the soldering tip fastening sleeve does not have provided thereon any collar. An axial distance 20 is provided between an edge 19 of the second subsector 18 and the collar holder 10. This axial distance is measured in the direction of the center axis 12 of the soldering tip fastening sleeve 3.

FIG. 4 shows the view of FIG. 3, the soldering tip fastening portion 6 having here additionally inserted therein a soldering tip 2. Here, it can also be seen that a stem 26 is provided between the soldering portion 4 and the fastening portion 5. An external dimension of this stem is smaller than the one of the collar 9. In addition, it can be seen that the soldering tip 2 is a hollow tip into which a heating element 21 of the soldering device 30 can be inserted. As will be explained hereinbelow, it is, however, also imaginable that the soldering tip 2 is made of solid material and that a corresponding heating element 21 is provided, which extends only up to a base 22 of the soldering tip. FIG. 4 shows clearly that an axial form- and/or force-fit connection is established by the engagement between the collar holder 10 and the collar 9. The engagement between a circumferential surface 32 of the collar 9 and the edge 19 of the soldering tip fastening sleeve 3 establishes a form- and/or force-fit connection in a radial direction. Together with the heating element 21 inserted in the soldering tip 2 or the heating element 21 abutting on the base 22 (cf. in this respect also FIG. 9), the soldering tip 2 is thus reliably secured in position on a soldering device.

FIG. 5 shows a front view of the soldering tip fastening sleeve looking at the soldering tip fastening portion 6. It can clearly be seen that the collar holder 10 is provided on a first subsector 17 of the soldering tip fastening sleeve, said first subsector 17 having a first central angle 23. In the present embodiment, this first central angle 23 is an angle of 180°. It may, however, also assume any other value, preferably, however, a value between 0° and 180°. Also the second subsector 18, which does not have provided thereon any collar holder and which has a second central angle 24, can be seen in this figure. As can best be seen in FIGS. 1 and 2, a respective recess 11 may be provided at the transitions between the first and second subsectors 17, 18, said recess facilitating insertion of the collar into the soldering tip fastening portion 6. The edge 19 of the second subsector 18 may have provided thereon a projection 25 according to a second embodiment. This projection may serve to additionally secure the soldering tip 2 in position.

Figure 6A:
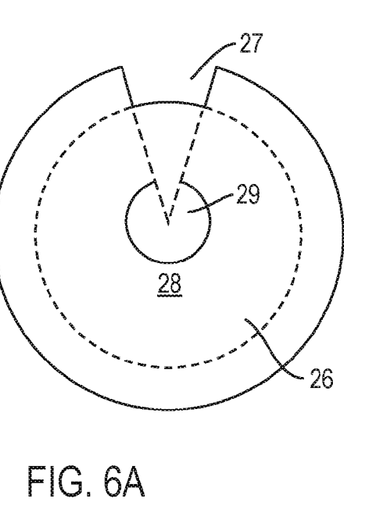
FIGS. 6A and 6B show a rear views of a soldering tip according to the present invention in accordance with a second embodiment with view directed axially towards a fastening portion of the soldering tip.
Figure 6B:
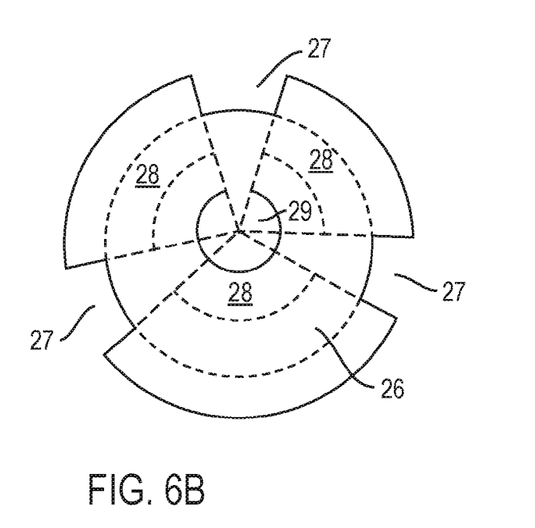
Figure 7A:
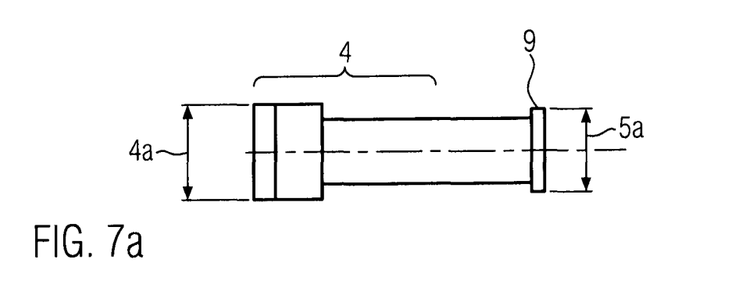
FIGS. 7a to 7d show various possibilities of designing the soldering portion of the soldering tip, which can be provided in the case of a soldering tip according to the first embodiment as well as in the case of a soldering tip according to the second embodiment.
Figure 7B:
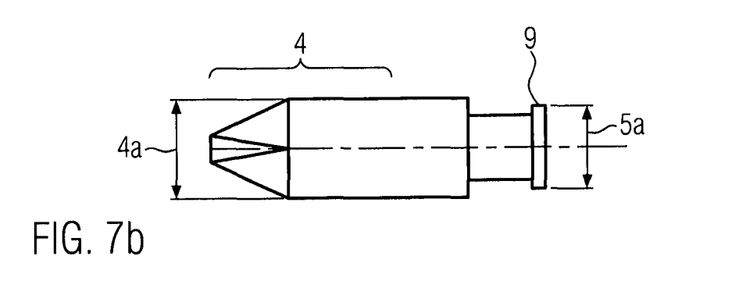
Figure 7C:
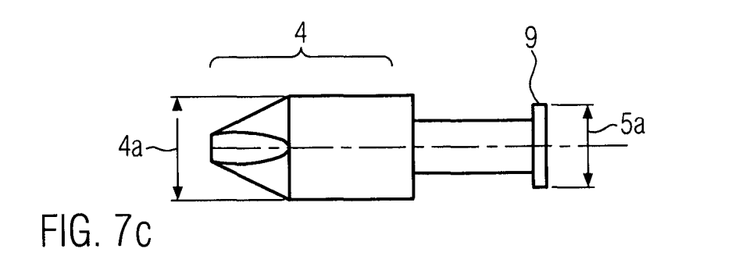
Figure 7D:
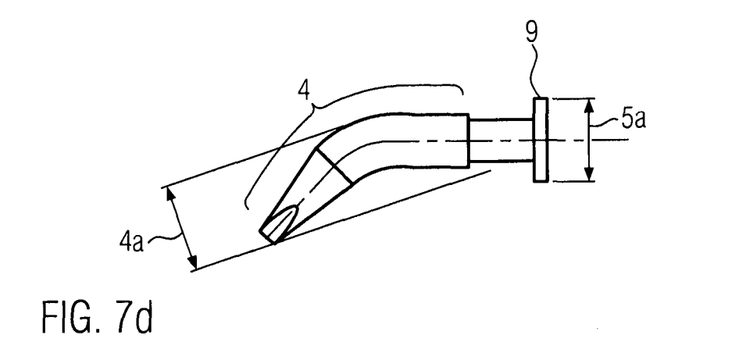

FIGS. 6A and 6B show a representation of the soldering tip 2 according to the second embodiment with view directed towards the base 22. The stem 26 of the soldering tip is not visible and indicated by a circle represented by a broken line. The collar 9 of the soldering tip 2 has provided therein a recess 27. This recess can receive therein the projection 25 on the soldering tip fastening sleeve 3. The projection 25 and the recess 27 may here be configured such that, when brought into engagement with one another, they fix the soldering tip 2 in a predefined orientation relative to the soldering tip fastening sleeve 3. It is also imaginable that the collar 9 is moved fully past the projection 25 and that the soldering tip 2 is then rotated about the center axis 12. An additional locking effect can be provided in this way.

In FIGS. 6A and 6B the recess 27 extends down to the circumferential surface of the stem 26. It is, however, also imaginable that the recess is not so deep, i.e. that in the area of the recess a part of the collar 9 extends beyond the cross-section of the stem 26. It is, however, also imaginable that the recess extends down to and into the stem 26.

The recess 27 may also be formed by the collar 9 being provided on a third subsector 28 of the soldering tip 2. When only one recess 27 is provided (FIG. 6A), the third subsector 28 has a third central angle 29 of 330° or more. It is, however, also conceivable that a plurality of third subsectors 28 (FIG. 6B) and, consequently, also a plurality of recesses 27 are provided. In this way, the soldering tip 2 can e.g. be inserted more easily into the soldering tip fastening portion 6, since it will suffice to rotate the soldering tip 2 about the center axis 12 to a lesser extent in order to bring one of the recesses 27 into alignment with the projection 25.

FIG. 7a to FIG. 7d show various imaginable variants of the structural design of the soldering portion 4 of the soldering tip 2. These structural designs have substantially in common that they prevent the soldering tip 2 from being passed through the soldering tip fastening sleeve 3, when said soldering tip 2 is to be fixed to the soldering device through the collar 9.

Figure 8A:
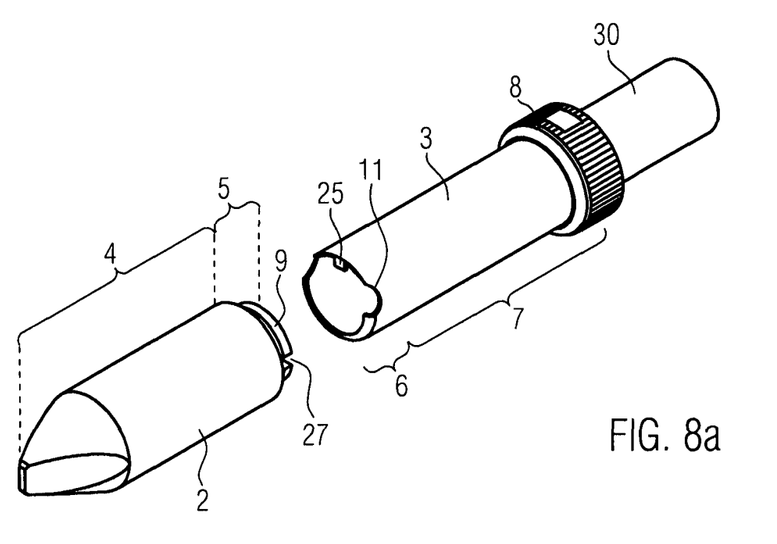
FIGS. 8a and 8b show perspective views of a soldering tip fastening system according to the present invention in accordance with a second embodiment.
Figure 8B:
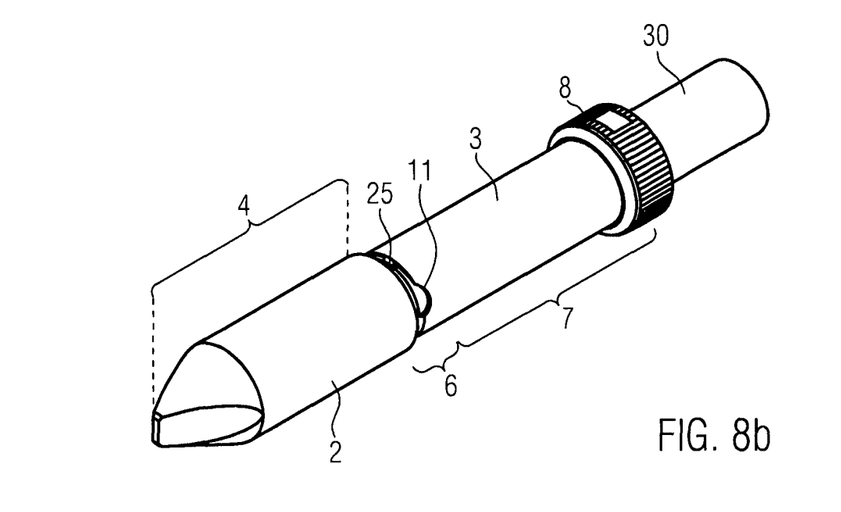

FIGS. 8a and 8b show a second embodiment, in the case of which the soldering tip fastening sleeve 3 has a projection 25 and the collar 9 of the soldering tip 2 has a recess 27.

Figure 9:
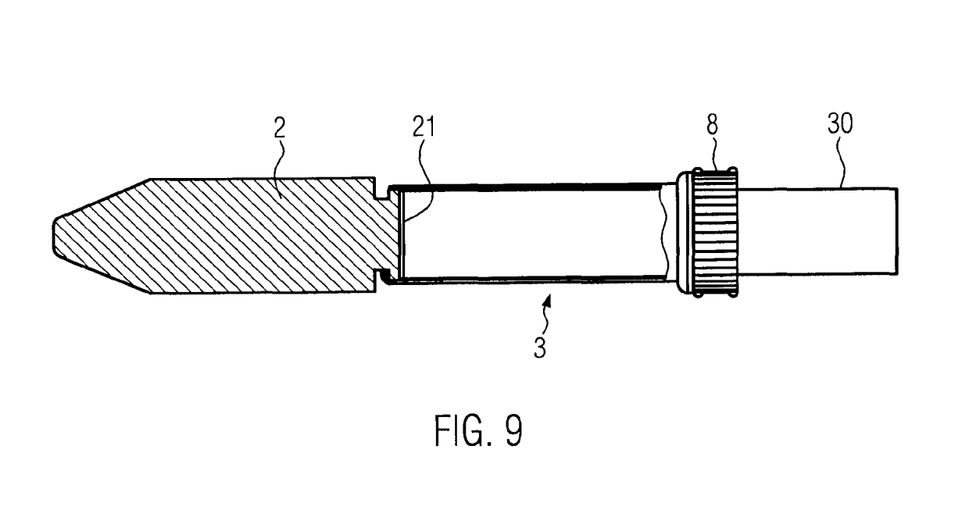
FIG. 9 shows exemplarily a sectional side view of a soldering tip fastening system according to the present invention in accordance with the second embodiment, whereby a configuration of a heating element of a soldering device becomes visible.

FIG. 9 shows the second embodiment in a variant with a soldering tip 2 made of solid material and a complementary, flat heating element 21.

Figure 10:
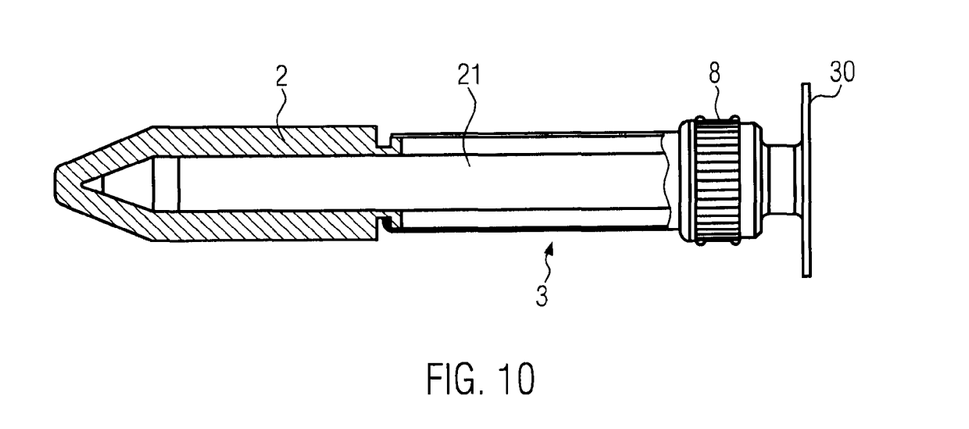
FIG. 10 shows a sectional side view of a soldering tip fastening system according to the present invention in accordance with the first embodiment, in which an alternative configuration of a heating element of a soldering device can be seen.

FIG. 10 shows exemplarily a soldering tip 2, which is configured as a hollow tip and into which a heating element 21 extends, in combination with the first embodiment of the soldering tip fastening system 1. It is, however, also possible to combine the first embodiment of the soldering tip fastening system 1 with a soldering tip 2 of solid material, or to combine a soldering tip 2 configured as a hollow tip with a soldering tip fastening system according to the second embodiment.

Figure 11:
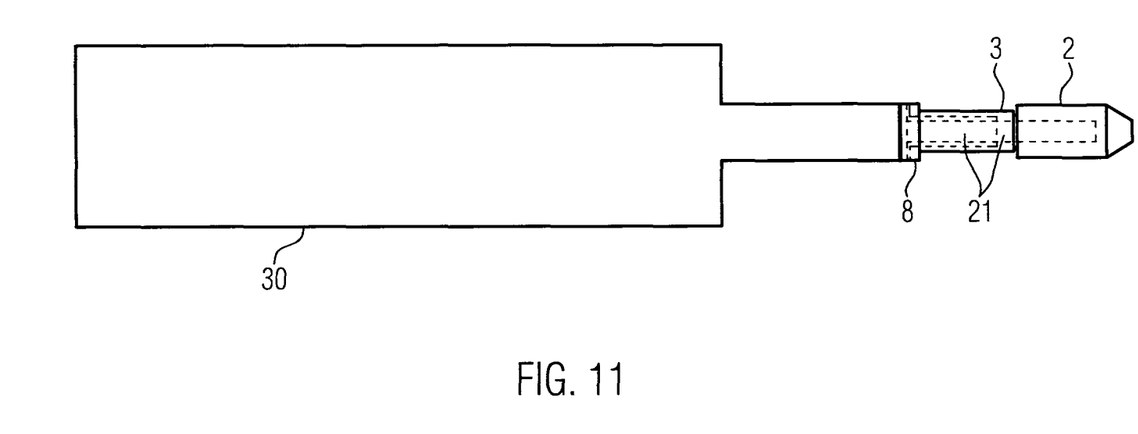
FIG. 11 shows schematically a soldering device according to the present invention and a soldering tip according to the present invention secured to the soldering device by a soldering tip fastening sleeve according to the present invention.

FIG. 11 shows a schematic representation of a soldering device 30 according to the present invention. The soldering device 30 may be a soldering iron, as in the case of the embodiment shown. However, any other soldering device, such as soldering stations, are imaginable as well. The broken lines indicate two possible configurations of the heating element 21, since said heating element is normally concealed by the soldering tip fastening sleeve and the soldering tip 2. The soldering tip fastening sleeve 3 secures the soldering tip 2 in position on the soldering device 30. Since FIG. 11 only serves to explain how the individual components are arranged relative to one another, the above described fastening structures on the soldering tip fastening sleeve 3 and the soldering tip 2 are not shown in detail for the sake of simplicity.

The invention claimed is:
1. A soldering tip fastening sleeve, comprising:
a soldering device fastening portion having an internal measurement and an external measurement;

a soldering tip fastening portion having an internal measurement, an external measurement, and a collar holder;

wherein the soldering tip fastening portion and the soldering device fastening portion are associated with different ends of the soldering tip fastening sleeve;

wherein the soldering tip fastening portion comprises:
  a first subsector of a circumference of the soldering tip fastening sleeve; and
  a second subsector of the circumference of the soldering tip fastening sleeve different from said first subsector, each of said first and second subsectors forming a circumferential arc about a center axis of the soldering tip fastening sleeve;
  wherein the collar holder-spans an arc of the first subsector;

wherein said first subsector and said second subsector each span less than the entire circumference of the soldering tip fastening sleeve and said second subsector does not include any portion of the collar holder; and wherein the soldering tip fastening sleeve is provided with a recess at a transition between the first and second subsectors.

2. The soldering tip fastening sleeve of claim 1, wherein the collar holder delimits the internal measurement of the soldering tip fastening portion.

3. The soldering tip fastening sleeve of claim 1, wherein the internal measurement of the soldering tip fastening portion is smaller than the internal measurement of the soldering device fastening portion.

4. The soldering tip fastening sleeve of claim 1, wherein the first subsector forms a circumferential arc about a center axis of the soldering tip fastening sleeve of 180° or less.

5. The soldering tip fastening sleeve of claim 1, wherein the second subsector has provided thereon a projection extending inwardly towards a center axis of the soldering tip fastening sleeve.

6. The soldering tip fastening sleeve of claim 1, wherein an edge of the second subsector is spaced apart from an edge of the collar holder in an axial direction of the soldering tip fastening sleeve.

7. The soldering tip fastening sleeve of claim 1, wherein the collar holder comprises an inwardly flanged structure.

8. The soldering tip fastening sleeve of claim 1, wherein the soldering device fastening portion is provided with a nut which is configured for being screw-fastened to a soldering device.

9. The soldering tip fastening sleeve of claim 8, wherein the nut is connected to the soldering tip fastening sleeve in a non-releasable manner or formed integrally therewith.

10. The soldering tip fastening sleeve of claim 8, wherein the nut is a union nut.

11. A soldering tip fastening system, comprising:
a soldering tip fastening sleeve;
a soldering tip;
wherein the soldering tip fastening sleeve comprises:
  a soldering device fastening portion having an internal measurement and an external measurement;
  a soldering tip fastening portion having an internal measurement, an external measurement, and a collar holder,
  wherein the soldering tip fastening portion and the soldering device fastening portion are associated with different ends of the soldering tip fastening sleeve;
  wherein the soldering tip fastening portion comprises:
    a first subsector of a circumference of the soldering tip fastening sleeve; and
    a second subsector of the circumference of the soldering tip fastening sleeve different from said first subsector, each of said first and second subsectors forming a circumferential arc about a center axis of the soldering tip fastening sleeve;
    wherein the collar holder spans an arc of the first subsector; and
  wherein said first subsector and said second subsector each span less than the entire circumference of the soldering tip fastening sleeve and said second subsector does not include any portion of the collar holder;
wherein the soldering tip comprises:
  a soldering portion;
  a fastening portion, the fastening portion adapted to fix the soldering tip to the soldering tip fastening sleeve;
  wherein a maximum external measurement of the fastening portion is smaller than a maximum external measurement of the soldering portion;
  wherein the fastening portion comprises a collar.

12. The soldering tip fastening system of claim 11, wherein an end of the collar holder extends along the center axis past an edge of the second subsector by an axial distance to facilitate insertion of the soldering tip into the soldering tip fastening sleeve by a pivotal movement and/or translationally in a direction R, wherein direction R extends at an angle relative to a center axis of the soldering tip fastening sleeve.

13. The soldering tip fastening system of claim 11:
wherein the soldering tip fastening portion includes a second subsector of the circumference of the soldering tip fastening sleeve different from said first subsector and spanning less than the entire circumference of the soldering tip fastening sleeve, wherein said second subsector does not include any portion of the collar holder;
wherein an edge of the second subsector is spaced apart from an edge of the collar holder in an axial direction of the soldering tip fastening sleeve;
wherein an axial distance between the edge of the second subsector and the edge of the collar holder is smaller than an axial thickness of the collar.

14. The soldering tip fastening system of claim 11:
wherein the soldering tip fastening portion includes a second subsector of the circumference of the soldering tip fastening sleeve different from said first subsector and spanning less than the entire circumference of the soldering tip fastening sleeve, wherein said second subsector does not include any portion of the collar holder;
wherein the second subsector has provided thereon a projection;
wherein the collar of the soldering tip is provided with a recess;
wherein the projection is configured to be accommodated in the recess of the collar.

15. The soldering tip fastening system of claim 11, wherein a maximum external measurement of the soldering portion of the soldering tip is larger than a minimum internal measurement of the soldering tip fastening sleeve.

16. The soldering tip fastening system of claim 11, wherein a maximum external measurement of the soldering portion of the soldering tip is larger than a maximum external measurement of the soldering tip fastening sleeve.

17. The soldering tip fastening system of claim 11, wherein a maximum external measurement of the soldering portion of the soldering tip is larger than an internal measurement of the soldering tip fastening portion.

18. A soldering device, comprising at least one of:
  a soldering tip fastening sleeve;
  a soldering tip;
  a soldering tip fastening system;
  wherein the soldering tip fastening sleeve comprises:
    a soldering device fastening portion having an internal measurement and an external measurement;
    a soldering tip fastening portion having an internal measurement, an external measurement, and a collar holder,
    wherein the soldering tip fastening portion and the soldering device fastening portion are associated with different ends of the soldering tip fastening sleeve;
    wherein the soldering tip fastening portion comprises:
      a first subsector of a circumference of the soldering tip fastening sleeve; and
      a second subsector of the circumference of the soldering tip fastening sleeve different from said first subsector, each of said first and second subsectors forming a circumferential arc about a center axis of the soldering tip fastening sleeve;
      wherein the collar holder spans an arc of the first subsector;
    wherein said first subsector and said second subsector each span less than the entire circumference of the soldering tip fastening sleeve and the second subsector does not include any portion of the collar holder; and
    wherein the soldering tip fastening sleeve is provided with a recess at a transition between the first and second subsectors;
  wherein the soldering tip comprises:
    a soldering portion;
    a fastening portion, the fastening portion adapted to fix the soldering tip to the soldering tip fastening sleeve;
    wherein a maximum external measurement of the fastening portion is smaller than a maximum external measurement of the soldering portion;
    wherein the fastening portion comprises a collar;
  wherein the soldering tip fastening system comprises the soldering tip fastening sleeve and the soldering tip.

* * * * *